United States Patent [19]

Moussaian

[11] Patent Number: 4,635,974
[45] Date of Patent: Jan. 13, 1987

[54] RAPIDLY ASSEMBLED AND DISASSEMBLED CONNECTING DEVICE

[76] Inventor: Grégoire Moussaian, Résidence Les Plantines, 78840 Freneuse, France

[21] Appl. No.: 555,632

[22] Filed: Nov. 25, 1983

[30] Foreign Application Priority Data

Nov. 25, 1982 [FR] France ............................ 82 19800

[51] Int. Cl.[4] .................................................. F16L 37/00
[52] U.S. Cl. .................................... 285/305; 285/321; 285/403; 285/921
[58] Field of Search ............... 285/305, 304, DIG. 22, 285/321, 403

[56] References Cited

U.S. PATENT DOCUMENTS

| | | | |
|---|---|---|---|
| 3,450,424 | 6/1969 | Calisher | 285/305 |
| 3,753,582 | 8/1973 | Graham | 285/305 |
| 4,009,896 | 3/1977 | Brewer | 285/305 |

FOREIGN PATENT DOCUMENTS

| | | | |
|---|---|---|---|
| 815428 | 10/1951 | Fed. Rep. of Germany . | |
| 2028711 | 12/1971 | Fed. Rep. of Germany | 285/305 |
| 1396434 | 3/1965 | France | 285/305 |
| 179377 | 11/1973 | France . | |
| 1303475 | 1/1973 | United Kingdom | 285/305 |

Primary Examiner—Richard J. Scanlan, Jr.
Attorney, Agent, or Firm—Wenderoth, Lind & Ponack

[57] ABSTRACT

A connecting device includes, a female element constituted by a socket 1 and a male element having a spigot which is adapted to be inserted in a complementary chamber in the socket 1. Disposed in the chamber is a cavity which receives a resilient retaining member 16. The spigot 16 has a recess in which a portion of the retaining member is received when the spigot is inserted in the chamber.

1 Claim, 6 Drawing Figures

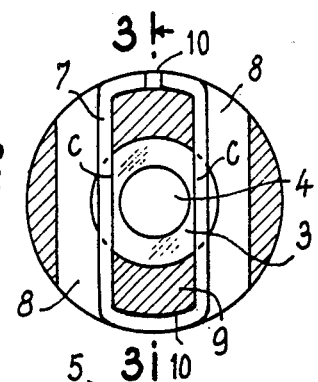
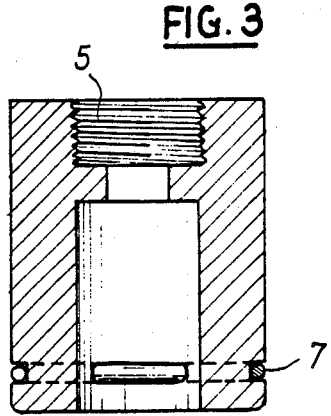
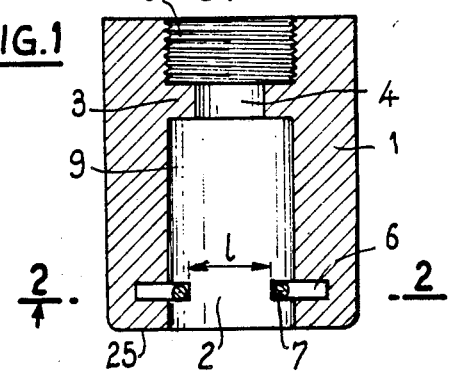
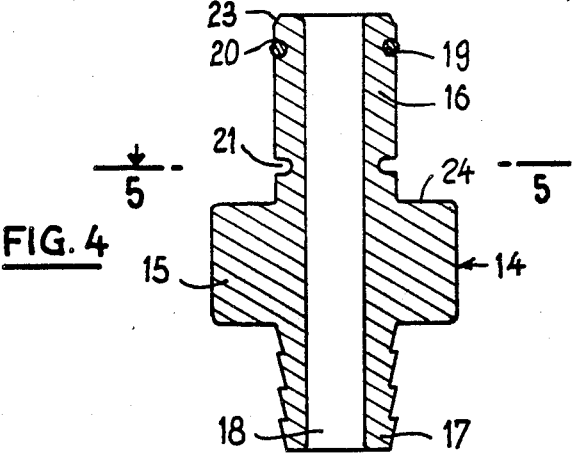
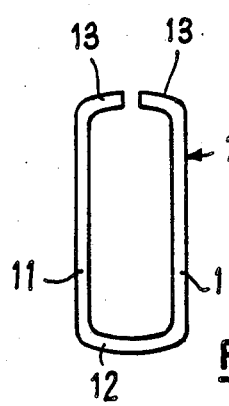
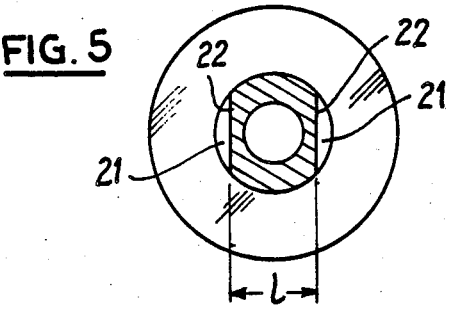

RAPIDLY ASSEMBLED AND DISASSEMBLED CONNECTING DEVICE

BACKGROUND OF THE INVENTION

The present invention relates to a rapidly assembled and disassembled connecting device.

A considerable number of applications exist in many fields where it is necessary to employ a device for connecting two elements which permits a rapid assembly and disassembly of these elements, for example for the assembly of parts of furniture which can be disassembled, the construction of frameworks, shelves or the like, in the field of taps and pipe fittings, sport equipment, for example wind-surf boards for mounting the mast, and generally whenever two rigid elements must be capable of being assembled and separated instantaneously without tools, with the assembly having a relatively great resistance to tensile forces.

SUMMARY OF THE INVENTION

An object of the invention is to provide such a connecting device which is extremely simple to use and manufacture and has a very small number of component parts and is consequently inexpensive and moreover is suitable for all the applications mentioned hereinbefore.

The invention consequently provides a rapidly assembled and disassembled connecting device, of the type comprising a female element constituted by a socket and a male element, wherein the socket has a chamber of circular section and a cavity adapted to receive a spring member having two parallel rectilinear branches which intersect said chamber along two parallel chords, said male element having in section a shape which is complementary to that of said chamber and having in its outer surface two opposed recesses adapted to cooperate with said branches of the spring member.

BRIEF DESCRIPTION OF THE DRAWINGS

Further features and advantages of the invention will be apparent from the following description with reference to the accompanying drawing which are given solely by way of example and in which:

FIG. 1 is a longitudinal sectional view of a socket constituting a female element of a connecting device according to the invention;

FIG. 2 is a sectional view taken along line 2—2 of FIG. 1;

FIG. 3 is a sectional view taken along line 3—3 of FIG. 2;

FIG. 4 is a longitudinal sectional view of a male element of the connecting device according to the invention;

FIG. 5 is a sectional view taken along line 5—5 of FIG. 4; and

FIG. 6 is a view of a resilient retaining member of the device according to the invention.

DETAILED DESCRIPTION OF THE INVENTION

FIG. 1 shows a socket constituting the female element of the connecting device according to the invention, said socket having a cylindrical body 1 defining a chamber 2 which has a circular cross-sectional shape and is defined in depth by an inner radially extending flange 3 surrounding a central passage 4 which connects the chamber 2 to a chamber 5 provided at the end of the body 1 opposed to the end in which the chamber 2 is provided.

Provided in the vicinity of the entrance opening of the chamber 2 is a cavity 6 in the thickness of the body 1 for receiving a resilient retaining member 7 (FIG. 6).

With reference to FIG. 2, which is a sectional view in a plane containing the retaining member 7, it can be seen that the cavity 6 is formed by two parallel passages 8 formed in the body 1 on each side of the chamber 2, the two ends of these passages communicating with the exterior of the body. These two passages 8 intersect the chamber 2 along two parallel chords "c" and define therebetween two symmetrical massive portions 9 whose confronting faces have a concave shape defined by a part of the chamber 2 and whose outer walls 10 are convex and set back relative to the outer surface of the body 1 so as to define two recesses in which the end portions of the resilient retaining member 7 are received.

This resilient member 7 shown in FIG. 6 has a general U-shape including two parallel rectilinear lateral arms 11 interconnected by a curved intermediate portion 12 whose radius of curvature is equal to the radius of the body 1, the end portions 13 of the branches 11 being bent inwardly.

The resilient or spring retaining member 7 is engaged in the cavity 6 of the body 1 by separating its end portions 13 so as to pass its branches 11 on each side of the massive portions 9 so that the intermediate portion 12 and the end portions 13 of the retaining member are disposed in the recesses interconnecting the passages 8 at the ends of the latter (FIG. 2).

It will be observed that the passages 8 are sufficiently wide to permit the passage of the branches 11 in an oblique position of the latter.

It will be understood that, with this arrangement, the branches 11 of the retaining member 7 intersect the chamber 2 along two parallel chords designated by the reference "C", intermediate portions of the two branches 11 being thus exposed in the chamber 2, while the folded end portions 13 of the branches hold the retaining member 7 in position on the body 1.

FIGS. 4 and 5 show the male element of the device according to the invention, which is adapted to cooperate with the socket constituting the female element.

The male element 14 has a massive body 15 of circular shape in section. Extending from one side of the body 15 is a spigot 16 of circular sectional shape having a diameter equal to the inside diameter of the chamber 2 of the female element and, extending from its opposite side, is a spigot 17. An axial passage 18 extends through the spigots 16 and 17 and the body 15. Preferably, the passage 18 has an inside diameter which is equal to the diameter of the passage 4 defined by the inner annular flange 3 of the female element, when the device is for example intended to interconnect two fluid-conveying pipes.

The spigot 16 has in the vicinity of its end a recess 19 in which is advantageously disposed an O-section sealing ring 20 of elastomeric material.

The spigot 16 has in the vicinity of the shoulder 24 it defines with the body 15 two recesses 21 whose bottoms 22 are parallel to each other and spaced apart a distance "l" which is equal to the distance between the chords "C" defined in the chamber 2 by the branches 11 of the retaining member 7.

It will be understood that the bottoms 22 of the recesses 21 constitute two flat surfaces the height of which is equal to the width of the recesses 21, this width being roughly equal to the section of the retaining member 7.

In the illustrated embodiment, the spigot 17 has a series of shoulders having a sawtooth sectional shape, for example adapted to receive and retain a tubular element, for example a pipe or a rigid tubular element such as for example the mast of a wind-surf board (not shown).

The spigot 16 has on its peripheral end edge a slight chamfer 23.

It will be understood that, when the spigot 16 of the male element 14 is inserted in the chamber 2 of the female element, the peripheral chamfer 23 first of all comes into contact with the intermediate portions of the branches 11 of the retaining member 7 and causes these branches to spread apart in a resilient manner.

The male element 14 is inserted in the chamber 2 in any angular position relative to the female element and, when the shoulder 24 between the spigot 16 and the body 15 comes into contact with the end 25 of the body 1, the retaining member 7 is in lateral alignment with the recesses 21.

If the male element is then rotated in the female element in either direction, there is reached a relative angular position of the two elements in which the bottoms 22 of the two recesses 21 are parallel to the chords "C" formed by the branches 11 of the retaining member 7. At this moment, these branches resiliently move toward each other and engage in the recesses 21 and thus very firmly retain the male element in the female element owing to the fact that the intermediate portions of the branches 11 can only be subjected to shear stress in a very short length thereof when it is attempted to separate the two elements of the connecting device.

The resistance of the connecting device as concerns a pulling force exerted on the two elements thereof is consequently mainly a function of the strength of the material from which the two elements are made.

In the assembled position of the device, the recesses 21 of the male element cooperate with the passages 8 so as to complete a cavity in which the branches 11 of the retaining member 7 can extend in the unstressed state in intersecting the peripheries of the chamber 2 and the spigot 16 along chords of the latter.

It will also be understood that, in order to separate the two elements, it is sufficient to rotate the male element relative to the female element in either direction until an angular position is reached in which the ends of the bottoms 22 of the recesses 21 act as cams and spread apart the branches 11 of the retaining member until the convex portions of the spigot 16 located between the ends of the recesses 21 come into contact with the branches 11 of the retaining member and thus completely escape from the retaining member.

It will also be understood that indicia (not shown) may be provided on the body 15 of the male element and on the body 1 of the female element so as to indicate the positions in which the two elements are relatively retained and in which these two elements may be separated.

The connecting device according to the invention having in all three component parts is extremely simple to manufacture and consequently particularly is inexpensive. It is also extremely simple to use while it has an extremely high resistance to pulling forces, which is only limited by the strength of the material in the region of the recesses 21 of the male element or by the shear strength of the intermediate portions of the branches 11 of the retaining member, which is very high even with a small section of these branches.

What is claimed is:

1. A connecting device capable of rapid assembly and disassembly, said device comprising:

a female element having a longitudinal axis and including a body having therein a chamber defining a socket, said female element having therein two substantially parallel rectilinear passages located on opposite sides of said chamber, said passages extending entirely through said body of said female element and communicating with the exterior of said body of said female element;

a male element having a spigot complementary in shape to said chamber, said spigot having formed in opposite sides thereof two substantially parallel rectilinear recesses;

said female and male elements being relatively movable axially between a first axial position, whereat said spigot extends into said chamber, and a second axial position, whereat said spigot is withdrawn from said chamber;

said female and male elements being relatively rotatable about said axis when said elements are in said first axial position between a locking position, whereat said recesses are aligned with respective said passage, and a releasing position, whereat said recesses and passages are out of alignment;

a resiliently yieldable retaining member comprising a U-shaped spring member having two branches capable of being resiliently spread apart without permanent deformation, said branches extending into respective said passages and into respective said recesses when said female and male elements are in said locking position, thereby locking said female and male elements in said first axial position, and said branches, upon relative rotation of said female and male elements to said releasing position, being resiliently spread apart to remove said branches from said recesses, thereby enabling axial movement between said female and male elements to said second position;

said passages having widths sufficient to permit insertion therethrough of said branches with said branches extending obliquely with respect to each other, and to allow additional spreading apart of said branches over the entire length thereof upon axial movement of said female and male elements from said second axial position to said first axial position; and second recesses formed in said female element, each said second recess extending between respective adjacent ends of said passages, and said branches having respective opposite end portions deformed to fit in said second recesses when said female and male elements are in said locking position.

* * * * *